(12) United States Patent
Mitsutomi et al.

(10) Patent No.: US 12,123,478 B2
(45) Date of Patent: Oct. 22, 2024

(54) V-RIBBED BELT, PRODUCTION METHOD THEREFOR, AND RUBBER COMPOSITION

(71) Applicant: Mitsuboshi Belting Ltd., Kobe (JP)

(72) Inventors: Manabu Mitsutomi, Hyogo (JP); Yuji Kamba, Hyogo (JP); Yorifumi Hineno, Hyogo (JP); Hiroki Takechi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 438 days.

(21) Appl. No.: 17/442,940

(22) PCT Filed: Apr. 6, 2020

(86) PCT No.: PCT/JP2020/015587
§ 371 (c)(1),
(2) Date: Sep. 24, 2021

(87) PCT Pub. No.: WO2020/213462
PCT Pub. Date: Oct. 22, 2020

(65) Prior Publication Data
US 2022/0145962 A1    May 12, 2022

(30) Foreign Application Priority Data

Apr. 16, 2019 (JP) .................................. 2019-078096
Mar. 24, 2020 (JP) .................................. 2020-053084

(51) Int. Cl.
*F16G 5/08* (2006.01)
*B29D 29/10* (2006.01)
(Continued)

(52) U.S. Cl.
CPC ................. *F16G 5/08* (2013.01); *C08L 23/16* (2013.01); *F16G 5/06* (2013.01); *F16G 5/20* (2013.01)

(58) Field of Classification Search
CPC ..... F16G 5/20; F16G 5/08; F16G 5/06; F16G 5/00; F16G 5/04; F16G 1/00; F16G 1/06;
(Continued)

(56) References Cited

U.S. PATENT DOCUMENTS 5,387,160 A * 2/1995 Nakajima ................. C08K 5/39
474/271
5,860,883 A * 1/1999 Jonen ......................... F16G 5/20
474/271
(Continued)

FOREIGN PATENT DOCUMENTS

CN   103403390 A   11/2013
EP     3358216 A1    8/2018
(Continued)

OTHER PUBLICATIONS

Tensile strengths of common materials taken from the Engineering Toolbox website. pdf saved and attached for quick reference ( Year: 2003).*
(Continued)

*Primary Examiner* — Michael R Mansen
*Assistant Examiner* — Raveen J Dias
(74) *Attorney, Agent, or Firm* — Banner & Witcoff, Ltd.

(57) ABSTRACT

A V-ribbed belt which comprises core wires and a stretch rubber layer constituted of a vulcanizate of a rubber composition comprising a rubber ingredient and short is provided. The content of the short fibers in the rubber composition is 15-50 parts by mass per 100 parts by mass of the rubber ingredient and the rubber composition has a minimum Mooney scorch viscosity, as measured at 125° C., of 70-130.

10 Claims, 4 Drawing Sheets (51) Int. Cl.
*C08L 23/16* (2006.01)
*F16G 5/06* (2006.01)
*F16G 5/20* (2006.01)

(58) Field of Classification Search
CPC ..... F16G 1/08; F16G 1/10; F16G 1/28; B29D 29/10; B29D 29/103; B29D 29/106; D29D 29/106
USPC .................................................. 474/264, 265
See application file for complete search history.

(56) References Cited

U.S. PATENT DOCUMENTS

| | | | | |
|---|---|---|---|---|
| 6,489,385 | B1* | 12/2002 | Fujii | C08K 5/18 524/92 |
| 8,859,081 | B2* | 10/2014 | Baldovino | B32B 25/10 524/565 |
| 2005/0096433 | A1* | 5/2005 | Takehara | F16G 1/28 525/211 |
| 2007/0178792 | A1* | 8/2007 | Yoshida | F16G 1/28 442/293 |
| 2009/0291796 | A1* | 11/2009 | Mitsutomi | F16G 5/166 474/252 |
| 2010/0240809 | A1* | 9/2010 | Yamada | C08L 23/0815 524/81 |
| 2014/0066244 | A1* | 3/2014 | Furukawa | F16G 5/20 474/263 |
| 2016/0010723 | A1* | 1/2016 | Witt | F16G 5/06 474/263 |
| 2017/0030431 | A1* | 2/2017 | Duke, Jr. | F16G 5/20 |
| 2017/0299017 | A1* | 10/2017 | Gregg | F16G 1/04 |
| 2018/0313430 | A1* | 11/2018 | Ochoa | B29D 29/08 |
| 2019/0031862 | A1* | 1/2019 | Sato | C08L 55/02 |
| 2019/0276954 | A1 | 9/2019 | Tomoda | |
| 2021/0003194 | A1* | 1/2021 | Takechi | F16G 5/20 |
| 2021/0190176 | A1 | 6/2021 | Yokoyama et al. | |
| 2022/0099157 | A1* | 3/2022 | Mitsutomi | F16G 5/08 |
| 2023/0250268 | A1* | 8/2023 | Loyd | B32B 25/042 428/35.7 |

FOREIGN PATENT DOCUMENTS

| | | | | |
|---|---|---|---|---|
| JP | H09-317831 | A | 12/1997 | |
| JP | 2005-336295 | A | 12/2005 | |
| JP | 2007-198468 | A | 8/2007 | |
| JP | 2007-263128 | A | 10/2007 | |
| JP | 2008-304053 | A | 12/2008 | |
| JP | 2009052740 | A * | 3/2009 | |
| JP | 2009156467 | A * | 7/2009 | |
| JP | 2013-145032 | A | 7/2013 | |
| JP | 2016028214 | A * | 2/2016 | ............... F16G 5/08 |
| JP | 2017-128641 | A | 7/2017 | |
| JP | 2018-009588 | A | 1/2018 | |
| JP | 2018-071035 | A | 5/2018 | |
| JP | 2019-007618 | A | 1/2019 | |

OTHER PUBLICATIONS

Nov. 4, 2022—(CN) Notification of First Office Action—CN App 202080023188.5, Eng Tran.

Nov. 22, 2022—(EP) Extended EP Search Report—EP App 20791827.7.

Apr. 27, 2023—(CN) Notification of Second Office Action—CN App 202080023188.5, Eng Tran.

Jun. 23, 2020—International Search Report—Intl App PCT/JP2020/015587.

Aug. 12, 2023—(CN) Decision of Rejection—CN App 202080023188.5, Eng Tran.

* cited by examiner

V-RIBBED BELT, PRODUCTION METHOD THEREFOR, AND RUBBER COMPOSITION

CROSS REFERENCE TO RELATED APPLICATIONS

This is a U.S. National Phase Application under 35 U.S.C. § 371 of International Application No. PCT/JP2020/015587, filed Apr. 6, 2020, which claims priority to Japanese Application Nos. 2019-078096, filed Apr. 16, 2019, and 2020-053084, filed Mar. 24, 2020, which were published Under PCT Article 21 (2), the entire contents of which are incorporated herein by reference.

TECHNICAL FIELD

The present invention relates to a V-ribbed belt in which the positions of core wires in the belt thickness direction are stable, a manufacturing method therefor, and a rubber composition.

BACKGROUND ART

V-ribbed belts in which plural V-shaped ribs are formed approximately parallel with the belt circumferential direction and the surfaces of the ribs are covered with a fabric such as a knitted fabric are known as belts for driving an auxiliary machine of an automobile. Usually, V-ribbed belts in which the rib surfaces are covered with a fabric are manufactured by a molding die method (molded manufacturing method). In the molding die method, a formed body in which tension rubber, a core wire, compression rubber, a fabric, etc. are laminated needs to be pressed against an outer die. At this time, pressure of pressing the formed body produces a force causing the tension rubber to flow out to the compression rubber side passing through the gaps between the core wires. This tends to cause a phenomenon that the core wires are pushed out to the compression rubber side or, conversely, bite into the tension rubber. This makes the positions of the core wires to vary in the belt thickness direction, which in turn lowers the durability of the belt. Several methods for making an improvement in this problem have been proposed.

For example, JP-A-2018-9588 (Patent document 1) discloses a V-ribbed belt that is made up of a backside rubber, intermediate canvas, adhesion rubber, aramid core wires, main body rubber, and surface canvas, the main body rubber being formed with plural V-shaped ribs extending in the belt longitudinal direction. This V-ribbed belt is characterized in that the intermediate canvas which is provided closer to the belt back surface side than the aramid core wires are is made of a woven fabric consisting of warps extending in the belt longitudinal direction and wefts extending in the belt width direction and the density of the wefts of the intermediate canvas is higher than or equal to 20/cm. In Comparative Examples in which the density of the welts of the intermediate canvas is low and their elongation is small, the backside rubber goes between the core wires and the adhesion rubber sticks out to the rib side. On the other hand, in Working Example in which the density of the welts of the intermediate canvas is high and their elongation is large, a V-ribbed belt is obtained in which the backside rubber is located closer to the belt backside than the intermediate canvas is and a backside rubber having a prescribed thickness is formed between the aramid core wires and the belt back surface. It is also disclosed that the backside rubber layer is made of EPDM rubber, EPM rubber, or the like and the adhesion rubber is made of EPDM rubber, CR rubber, or the like.

JP-A-2019-7618 (Patent document 2) discloses a V-ribbed belt that includes twisted cords produced by mix-twisting high-elongation aramid fibers that are larger than or equal to 0.8% in the intermediate elongation at a specific load of 4 cN/dtex and 50-100 GPa in tensile elastic modulus and low-modulus fibers that are lower in tensile elastic modulus than the high-elongation aramid fibers. It is disclosed as advantages of the invention that disorder of the pitch of the core wires (arrangement of the core wires in the belt width direction) and damage of the core wires that occur during manufacture by a molding die method can be suppressed and the sounding resistance and durability of the V-ribbed belt can be kept high even in uses with high dynamic tension. It is also disclosed that a tension layer is made up of a cover canvas or a rubber composition. In Examples, a tension layer including nylon short fibers having fiber length of 0.5 mm by 15 parts by mass for 100 parts by mass of EPDM is prepared.

CITATION LIST

Patent Literature

Patent document 1: JP-A-2018-9588 (claim 1, paragraphs [0011] and [0017], and Examples)
Patent document 2: JP-A-2019-7618 (claim 1, paragraphs [0010], and Examples)

SUMMARY OF INVENTION

Technical Problems

However, although the structure disclosed in Patent document 1 can provide an advantage of preventing the backside rubber (tension rubber) form going between the core wires, as for the arrangement of the core wires merely evaluates the height from the belt back surface to the center line of the core wires and gives no consideration on position variations of the individual core wires. Furthermore, since the intermediate canvas is indispensable, there is a concern that manufacturing cost increases and belt bendability lowers.

Although Patent document 2 has a disclosure about the arrangement of the core wires in the belt width direction, no consideration is given to its arrangement in the belt thickness direction. Furthermore, the V-ribbed belt of Patent document 2 has an aspect that the transmission capacity may decrease because the inclusion of the low-modulus fibers makes the core wires prone to elongate. It is therefore difficult to employ this structure in the case where a high transmission capacity is required.

An object of the present invention is therefore to provide a V-ribbed belt in which the positions of core wires that have large elastic modulus and hence have small elongation can be stabilized in the belt thickness direction even though it is simple in structure and low in cost, as well as a manufacturing method therefor and a rubber composition.

Solution to Problems

The present inventors have diligently studied to solve the above problems and completed the present invention by finding that the positions of core wires that have large elastic modulus and small elongation can be stabilized in the belt thickness direction though a V-ribbed belt is simple in configuration and low in cost by forming a tension rubber layer of the V-ribbed belt with a vulcanizate of a rubber composition that includes short fibers of 15-50 parts by mass with respect to 100 parts by mass of a rubber component and has a minimum Mooney scorch viscosity measured at 125° C. of 70-130.

That is, a frictional power transmission belt of the present invention is a V-ribbed belt including:
a tension rubber layer made of a vulcanizate of a rubber composition including a rubber component and short fibers; and
a core wire,
in which a proportion of the short fibers in the rubber composition is 15-50 parts by mass with respect to 100 parts by mass of the rubber component, and
the rubber composition has a minimum Mooney scorch viscosity measured at 125° C. of 70-130.

The hardness (JIS-A) of the vulcanizate may be 80-90. The orientation direction of the short fibers may be the belt width direction. The average fiber length of the short fibers may be 1-10 mm. The tensile elastic modulus of fibers constituting the core wire may be 50 GPa or more. The core wire may be in contact (or close contact) with the vulcanizate. The deviation of the core wire in a belt thickness direction may be 0.08 mm or less.

The present invention includes a manufacturing method of the above V-ribbed belt, the method including a step of pressing a laminate including a sheet of the rubber composition and the core wire against a die.

The present invention also includes a rubber composition which is an unvulcanized rubber composition for forming a tension rubber layer of a V-ribbed belt, the rubber composition including a rubber component and short fibers,
in which a proportion of the short fibers is 15-50 parts by mass with respect to 100 parts by mass of the rubber component, and
the rubber composition has a minimum Mooney scorch viscosity measured at 125° C. of 70-130.

In this application, the minimum Mooney scorch viscosity of the rubber composition may be represented by "Vm" and the minimum Mooney scorch viscosity Vm is a value measured at 125° C. unless otherwise specified. An acrylic monomer and a methacrylic monomer may be referred to generically a (meth)acrylic monomer. A numerical range "XX-YY" means a range including the numerical values "XX" and "YY," that is, a range that is larger than or equal to "XX" and smaller than or equal to "YY."

Advantageous Effects of Invention

According to the present invention, since the tension rubber layer of the V-ribbed belt is made of the vulcanizate of the rubber composition including the short fibers at 15-50 parts by mass with respect to 100 parts by mass of the rubber component and having the minimum Mooney scorch viscosity measured at 125° C. of 70-130, the positions of the core wires that have large elastic modulus and small elongation can be stabilized in the belt thickness direction though the V-ribbed belt is simple in structure and low in cost.

DESCRIPTION OF EMBODIMENT

Figure 1:
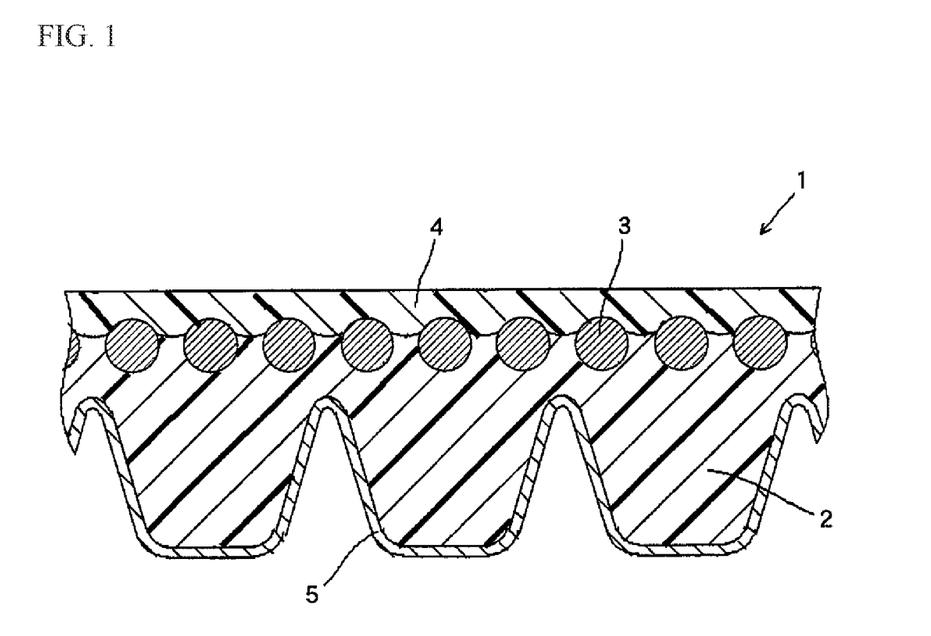
FIG. 1 is a rough sectional view showing an example of the V-ribbed belt of the present invention.

An embodiment of the present invention will be described in detail as an example of the invention by referring to the accompanying drawings when necessary. A V-ribbed belt according to the invention is characterized in that the transmission efficiency is high because plural V-shaped ribs are formed so as to extend in the belt circumferential direction. More specifically, as shown in FIG. 1, the V-ribbed belt 1 according to the invention includes a tension rubber layer 4 which forms a belt back surface (outer circumferential surface of the belt) and is made of a vulcanizate of a rubber composition containing a rubber component(s) and short fibers, a compression rubber layer 2 provided on the inner circumference side of the tension rubber layer 4, a fabric 5 which covers (is laid on) the surface (inner circumferential surface) of the compression rubber layer 2 to form a belt inner circumferential surface, and can come into contact with a pulley, and core wires 3 which are buried between the tension rubber layer 4 and the compression rubber layer 2 so as to extend along a belt longitudinal direction (circumferential direction). In this example, the core wires 3 are twisted cords arranged in a belt width direction at a prescribed interval and is in contact with the tension rubber layer 4 and the compression rubber layer 2 so as to be interposed between them. The compression rubber layer 2 is formed with plural grooves each having a V-shaped cross section extending in the belt longitudinal direction and plural ribs that are V-shaped (shaped like an inverted trapezoid) in cross section and are formed between these grooves. The two inclined surfaces of each rib can come into contact with the pulley via the fabric 5.

[Tension Rubber Layer]

In the present invention, since the tension rubber layer is made of a vulcanizate of a rubber composition that is high in minimum Mooney scorch viscosity and contains many short fibers, phenomena that the rubber component of the tension rubber layer flows out to the compression rubber layer side through gaps between the core wires and that the core wires bite into the rubber component of the tension rubber layer can be suppressed. Thus, the positions of the core wires can be made stable, and the durability of the V-ribbed belt 1 can be improved.

(Rubber Component)

Examples of the rubber component are known rubber components and/or elastomers such as diene-based rubber (e.g., natural rubber, isoprene rubber, butadiene rubber, chloroprene rubber, styrene-butadiene rubber (SBR), acrylonitrile-butadiene rubber (nitrile rubber), hydrogenated nitrile rubber (including a mixed polymer of hydrogenated nitrile rubber and a metal salt of an unsaturated carboxylic acid)), ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluororubber. These components can be used either singly or in combination.

Among the above rubber components, ethylene-α-olefin elastomer (e.g., ethylene-α-olefin-based rubber such as ethylene-propylene copolymer (EPM) and ethylene-propylene-diene ternary copolymer (e.g., EPDM)) are preferable because they are excellent in ozone-resistance, heat-resistance, cold-resistance and economy. Ethylene-propylene-diene-based copolymers such as EPDM are particularly preferable.

The diene content of ethylene-α-olefin elastomer can be selected preferably from an approximate range of 0.5-5 mass % (e.g., 1-4.5 mass %). To make it possible to increase the Mooney viscosity of the rubber composition and stabilize the positions of the core wires (i.e., to improve the stability of the core wires), the diene content of ethylene-α-olefin elastomer is, for example, about 0.5-3.5 mass %, preferably 1 to 3 mass % and even preferably 1.5-2.8 mass % (in particular, 2-2.5 mass %). If the diene content is too small, the crosslinking density decreases to possibly lower the rubber strength. Conversely, if the diene content is too large, the Mooney viscosity decrease to possibly lower the stability of the core wires. In this application, a diene content can be measured according to the ASTM D6047-17 standard test method.

As for preferable rubber component, only ethylene-α-olefin-based elastomer may be used. To adjust Vm of the rubber composition, ethylene-α-olefin-based elastomer as a first rubber component and another rubber component as a second rubber component may be combined together. The proportion of the second rubber component may be 50 parts by mass or smaller (e.g., 1 to 40 parts by mass, preferably about 5 to 30 parts by mass) with respect to 100 parts by mass of ethylene-α-olefin-based elastomer (first rubber component).

The Mooney viscosity (ML (1+4) 125° C.) of an unvulcanized rubber component (in particular, ethylene-α-olefin elastomer) can be selected preferably from an approximate range of 30-80. To make it possible to adjust Vm of the rubber composition and improve the stability of the core wires, the Mooney viscosity of the unvulcanized rubber component is, for example, about 35-75 (e.g., 40-73), preferably 45-70 (e.g., 50-68) and even preferably 55-65 (in particular, 58-63). The Mooney viscosity of the unvulcanized rubber component may be Mooney viscosity of a mixture of plural kinds of rubber components having different Mooney viscosity. If the Mooney viscosity is too low, Vm of the rubber composition also decreases to possibly lower the stability of the core wires. Conversely, if the Mooney viscosity is too high, the flowability of the rubber composition lowers to possibly cause a rib shape failure.

In this application, Mooney viscosity can be measured by a method according to JIS K 63(00-1 (2013). As for the test conditions, an L-type rotor is used, the test temperature is 125° C. the preliminary heating time is 1 minute, and the rotor operation time is 4 minutes.

Since it can improve the belt durability, the proportion of the rubber component (in particular, ethylene-α-olefin elastomer) with respect to the entire tension rubber layer (or the entire rubber composition of the tension rubber layer) is, for example, about 20-80 mass %, preferably 30-70 mass % (e.g., 40-60 mass %) and even preferably 45-55 mass % (in particular, 50-53 mass %). If the proportion of the rubber component with respect to the entire tension rubber layer is too small, the adhesiveness and the bending fatigue resistance of the tension rubber layer may lower. Conversely, if the proportion of the rubber component with respect to the entire tension rubber layer is too large, the stability of the core wires may lower.

(Short Fibers)

The present invention can increase the stability of the core wires as the tension rubber layer includes short fibers at a particular ratio with respect to the rubber component.

The short fiber includes natural fiber, synthetic fiber, inorganic fiber, etc.

Examples of natural fiber include cellulose-based fiber (cellulose fiber (e.g., cellulose fiber originating from a plant such as cotton, animal, or bacteria), regenerated fiber such as rayon, cellulose derivative fiber such as acetate, etc.), and fiber originating from an animal (e.g., wool and silk).

Examples of synthetic fiber include polyolefin fiber (e.g., polyethylene fiber and polypropylene fiber), acrylic fiber, vinyl alcohol-based fiber (e.g., polyvinyl alcohol fiber, ethylene-vinyl alcohol copolymer fiber, and vinylon), polyamide fiber (e.g., aliphatic polyamide fiber such as polyamide 6 fiber, polyamide 66 fiber, and polyamide 46 fiber and aromatic polyamide fiber such as aramid fiber), polyester fiber (e.g., $C_{2-4}$ alkylene $C_{6-14}$ arylate-based fiber such as polyethylene terephthalate (PET) fiber, polypropylene terephthalate (PPT) fiber, polytrimethylene terephthalate (PTT) fiber, polybutylene terephthalate (PBT) fiber, and polyethylene naphthalate (PEN) fiber, and polyarylate-based fiber), polyparaphenylene benzobisoxazole (PBO) fiber, and polyurethane fiber.

Examples of inorganic fiber include carbon fiber, glass fiber, and metal fiber.

The above kinds of short fiber can be used either singly or as a combination of two or more kinds thereof. Among the above kinds of short fiber, cellulose-based short fiber such as cotton and rayon, polyester short fiber (e.g., PET short fiber), polyamide short fiber (e.g., aliphatic polyamide short fiber such as polyamide 6 and aramid short fiber) are used widely and aliphatic polyamide short fiber is preferable because the positions of core wires can be more stabilized and it is superior in cost and wear resistance.

The average fineness of short fiber of synthetic fiber and inorganic fiber (in particular polyamide short fiber) is, for example, about 1-50 dtex, preferably 2-30 dtex and even preferably 3-20 dtex (in particular 5-10 dtex). If the fineness is too low, it may become difficult to disperse short fibers uniformly. Conversely, if the fineness is too high, mechanical properties of the tension rubber layer may degrade.

For example, the average fineness (count) of short fiber of natural fiber (in particular cotton short fiber) is about 3-20, preferably 5-15 (in particular, 7-10). If the fineness (count) is too large, it may become difficult to disperse short fibers uniformly. Conversely, if the fineness is too small, mechanical properties of the tension rubber layer may degrade.

In this application, average fineness of short fibers can be measured by a common method and may be measured by a weighing method, for example.

The average fiber length of the short fibers (in particular polyamide short fibers) can be selected preferably from an approximate range of 0.5-30 mm. The average fiber length of the short fibers may be, for example, about 1-10 mm, preferably 2-9 mm and even preferably 3-8 mm (in particular, 4-7 mm). If the fiber length is too short, the reinforcement effect of the short fibers lowers. Conversely, if the fiber length is too great, the orientation of the short fibers lowers. In either of the cases that the fiber length is too short and the fiber length is too great, the effect of suppressing phenomena that the rubber component of the tension rubber layer flows to the compression rubber layer side through gaps between the core wires and that the core wires bite into the tension rubber layer may lower.

In this application, an average fiber length of the short fibers can be measured by a common method. For example, average fiber length of the short fibers can be calculated as an arithmetic average of a proper number of samples (e.g., 50 samples) by performing an image analysis on a photograph taken by an electron microscope such as a transmission electron microscope or a scanning electron microscope.

Although the short fibers may be oriented either in random directions or in a prescribed direction, it is preferable that the short fibers be oriented in the belt width direction because this orientation can increase the stability of the core wires. Where the short fibers are oriented in the belt width direction, the length direction of the short fibers and the length direction of the core wires are approximately perpendicular to each other. Probably because the resistance occurring when the rubber component of the tension rubber layer goes through gaps between the core wires or the core wires bite into the tension rubber layer can be increased, the effect of suppressing the phenomena that the rubber component of the tension rubber layer flows out to the compression rubber side passing through the gaps between the core wires and that the core wires bite into the tension rubber layer is enhanced, whereby the positions of the core wires are made stable and the durability of the V-ribbed belt is improved.

In this application, the expression "short fibers are oriented in the belt width direction" means that the longitudinal direction (axial direction) of short fibers and the belt width direction are approximately parallel with each other and the expression "approximately parallel" means that the angle formed by the longitudinal direction (axial direction) of the short fibers and the belt width direction is within 30°, preferably within 20° and even preferably within 100 (in particular, within 5°).

A usable method for orienting the short fibers in a prescribed direction is, for example, a method of orienting the short fibers in a prescribed direction in a process of preparing an unvulcanized rubber sheet by rolling a rubber composition kneaded by a Banbury mixer or the like with rolls, a calender, or the like.

If necessary, the short fibers may be subjected to adhesion treatment to increase the adhesion to the rubber component (in particular, ethylene-α-olefin elastomer). The adhesion treatment may be common adhesion treatment such as treatment of immersing the short fibers in, for example, a resin-type treatment liquid obtained by solving an adhesive component (e.g., epoxy compound or isocyanate compound) in an organic solution e.g., (toluene, xylene, or methylethyl ketone), treatment of immersing the short fibers in a resorcin-formalin-latex liquid (RFL liquid), treatment of immersing the short fibers in mucilage obtained by solving a rubber composition in an organic solvent.

The proportion of the short fibers is about 15-50 parts by mass with respect to the rubber component of 100 parts by mass from the viewpoint of increasing the stability of the core wires, preferably 20-40 parts by mass and even preferably 25-35 parts by mass (in particular, 28-32 parts by mass). If the proportion of the short fibers is too small, the reinforcement effect may lower. Conversely, if the proportion of the short fibers is too large, the workability may lower and the durability may lower because cracks are prone to develop in the belt.

(Vulcanizing Agent and Crosslinking Agent)

Usually, the rubber composition further includes a vulcanizing agent and/or a crosslinking agent. Examples of the vulcanizing agent include sulfur, oximes (e.g., quinone dioxime), guanidines (e.g., diphenyl guanidine). An example of the crosslinking agent is an organic peroxide. Examples of the organic peroxide include common components such as diacyl peroxide (e.g., dilauroyl peroxide and dibenzoyl peroxide), peroxy ketal (e.g., 1,1-di(t-butylperoxy)cyclohexane and 2,2-di(t-butylperoxy)butane), alkylperoxy ester (e.g., t-butyl peroxybenzoate), dialkyl peroxide (e.g., di-t-butylperoxide, dicumyl peroxide, t-butylcumyl peroxide, 2,5-dimethyl-2,5-di(t-butylperoxy)hexane, 2,5-dimethyl-2,5-di(t-butylperoxy)hexyne-3,1,1-di(t-butyl peroxy)-3,3,5-trimethyl cyclohexane, 1,3-bis (2-t-butylperoxy isopropyl) benzene, and 2,5-di-methyl-2,5-di(benzoilperoxy)hexane), peroxycarbonate (e.g., t-butylperoxy isopropyl carbonate, t-butylperoxy-2-ethyl-hexylcarbonate, and t-amylperoxy-2-ethyl-hexylcarbonate). These vulcanizing agents and crosslinking agents can be used either singly or as a combination of two or more kinds thereof.

To improve the durability, the total proportion of the vulcanizing agent and the crosslinking agent can be selected preferably from a range of about 0.2-10 parts by mass with respect to 100 parts by mass of the rubber component (in particular, ethylene-α-olefin elastomer). The total proportion of the vulcanizing agent and the crosslinking agent is, for example, about 0.5-7 parts by mass, preferably 1-5 parts by mass (e.g., 1.5-4 parts by mass) and even preferably 1.5-3 parts by mass (in particular, 1.5-2.5 parts by mass). If the proportion of the vulcanizing agent and the crosslinking agent is too large, the rubber hardness may increase excessively to lower the durability. If the proportion of the vulcanizing agent and the crosslinking agent is too small, the crosslinking may not proceed sufficiently to render the strength and modulus of the rubber insufficient and make high-load transmission difficult.

(Reinforcement Agent or Reinforcing Filler)

The rubber composition may include carbon black and/or silica as a reinforcement agent (reinforcing filler). The addition of such a reinforcement agent makes it possible to increase Vm of the rubber composition and to adjust Vm of the rubber composition using the kind and addition amount of the reinforcement agent.

Various kinds of carbon black are classified by ASTM into "NOW*" to "N9**" (classification according to the iodine absorption). Conventionally, various kinds of carbon black are also classified into SAF, HAF, GPF, etc. according to the performance of a rubber product, etc.; N110 (SAF), N220 (ISAF), N330 (HAF), etc. having small primary particle diameters may be called "hard carbon" and N550 (FEF), N660 (GPF), N762 (SRF), etc. having large primary particle diameters may be called "soft carbon." These kinds of carbon black can be used either singly or as a combination of two or more kinds thereof.

The average particle diameter (average primary particle diameter) of carbon black is, for example, about 5-200 nm, preferably 10-150 nm and even preferably 15-120 nm (in particular, 20-100 nm). If the average particle diameter of carbon black is too small, the torque loss may become too large. If the average particle diameter of carbon black is too large, the mechanical characteristics of the belt main body may degrade.

In many cases, at least carbon black (hard carbon) having small primary particle diameters is used to increase the reinforcing property to the rubber, the hardness and wear resistance of the rubber, and the durability of the belt (high-load transmission performance). The average primary particle diameter of carbon black (hard carbon) is, for example, about 10-35 nm, preferably 15-33 nm and even preferably 20-32 nm (in particular, 25-30 nm). Hard carbon that is too small in average primary particle diameter may be difficult to prepare. Hard carbon that is too large in average primary particle diameter may lower the effect of enhancing the high-load transmission performance.

The iodine absorption of carbon black is, for example, about 5-200 mg/g, preferably 10-150 mg/g and even preferably 12-130 mg/g (in particular, 20-100 mg/g). The iodine absorption of hard carbon may be higher than or equal to 60 mg/g, for example, 60-150 mg/g, preferably 65-130 mg/g and even preferably about 70-100 mg/g (in particular, 75-90 mg/g). If the iodine absorption of hard carbon is too low, the effect of enhancing the high-load transmission performance may lower. Conversely, if the iodine absorption of hard carbon is too high, its preparation may become difficult.

Examples of silica includes dry silica, wet silica, and surface-treated silica. Furthermore, silica can be classified by the manufacturing method into, for example, dry method white carbon, wet method white carbon, colloidal silica, precipitated silica, etc. These kinds of silica can be used either singly or as a combination of two or more kinds thereof. Among these kinds of silica, silica having a surface silanol group (anhydrous silicic acid and hydrous silicic acid) is preferable; hydrous silicic acid having many surface silanol groups is strong in the chemical bond with the rubber component.

The average particle diameter (average primary particle diameter) of silica is, for example, about 1-500 nm, preferably 3-300 nm and even preferably 5-100 nm (in particular, 10-50 nm). If the silica particle diameter is too large, the reinforcing property of the belt main body may lower. If the silica particle diameter is too small, it may become difficult to disperse silica uniformly.

The nitrogen absorption specific surface area of silica measured by the BET method is, for example, about 50400 m$^2$/g, preferably 70-300 m$^2$/g and even preferably 100-250 m$^2$/g (in particular, 150-200 m$^2$/g). If the specific surface area is too large, torque loss is prone to occur and it may become difficult to disperse silica uniformly. If the specific surface area is too small, the reinforcing property to the rubber component may lower.

Fillers that are marketed as rubber reinforcement agents can be used as the above reinforcing fillers.

The proportion of the reinforcement agent (reinforcing filler) can be selected according to Vm of the rubber composition and may be 30 parts by mass or larger with respect to 100 parts by mass of the rubber component (in particular, unvulcanized rubber such as ethylene-α-olefin elastomer). The proportion of the reinforcement agent (reinforcing filler) may be, for example, about 30-150 parts by mass, preferably 35-120 parts by mass and even preferably 40-100 parts by mass (in particular, 45-80 parts by mass). More specifically, the proportion of carbon black can be selected according to Vm of the rubber composition and may be 20 parts by mass or larger with respect to 100 parts by mass of the rubber component (in particular, unvulcanized rubber such as ethylene-α-olefin elastomer). The proportion of carbon black is, for example, about 25-100 parts by mass, preferably 30-80 parts by mass and even preferably 35-70 parts by mass (in particular, 40-60 parts by mass). Vm of the rubber composition tends to increase as the proportion of carbon black becomes larger. If the proportion of carbon black is too small, the mechanical strength of the belt may lower. Conversely, if the proportion of carbon black is too large, it may be difficult to disperse it uniformly.

In this application, an average primary particle diameter of the reinforcing filler (carbon black and silica) can be calculated as an arithmetic average particle diameter of a proper number of samples (e.g., 50 samples) by performing an image analysis on a photograph taken by an electron microscope such as a transmission electron microscope or a scanning electron microscope. An iodine absorption amount of carbon black can be measured according to the ASTM D1510-19 standard test method. A close relationship exists between the iodine absorption amount and the primary particle diameter; the iodine absorption amount tends to increase as the primary particle diameter decreases.

(Other Components)

If necessary, the rubber composition may further contain common additives. Examples of common additives include a co-crosslinking agent (e.g., alkanepolyol poly(meth)acrylate such as ethyleneglycoldimethacrylate, butanedioldimethacrylate, trimethylol propanetrimethacrylate, and pentaerythritol tetramethacrylate; triallyl(iso)cyanurate; and bismaleimide such as N,N'-m-phenylane bismaleimide and N,N'-(4,4'-diphenyl methane bismaleimide)), a vulcanization aid, a vulcanization accelerator (e.g., thiuram-based accelerator), a vulcanization accelerator aid (e.g., steric acid), a vulcanization retarder, metal oxide (e.g., zinc oxide, magnesium oxide, calcium oxide, barium oxide, iron oxide, copper oxide, titanium oxide, and aluminum oxide), a filler (e.g., clay, calcium carbonate, talc, and mica), a plasticizer, a softener (e.g., oils such as paraffin oil and naphthenic oil), a finishing agent or finishing assistant (e.g., metal stearate salt, wax, and paraffin), an anti-aging agent (e.g., aromatic amine-based anti-aging agent and benzimidazole-based anti-aging agent), an adhesiveness improving agent (e.g., resorcin-formaldehyde co-condensate, melamine resin such as hexamethoxymethylmelamine, and co-condensate of those (e.g., resorcin-melamine-formaldehyde co-condensate)), a colorant, a tackifier, a coupling agent (e.g., silane coupling agent), a stabilizer (e.g., antioxidant, ultraviolet absorber, and heat stabilizer), a lubricant, a flame retardant, and an antistatic agent. These additives can be used either singly or as a combination of two or more kinds thereof.

Additives can be selected according to their kinds, and a total proportion of additives can be selected preferably from an approximate range of 0.1-30 parts by mass with respect to 100 parts by mass of the rubber component (in particular, ethylene-α-olefin elastomer). The total proportion of additives is, for example, about 1-30 parts by mass, preferably 3-25 parts by mass and even preferably 5-20 parts by mass (in particular 10-15 parts by mass).

(Characteristics of Tension Rubber Layer)

Minimum Mooney scorch viscosity (minimum value of Mooney viscosity) measured at 125° C. of the rubber composition (unvulcanized rubber composition) that forms the tension rubber layer is about 70-130, preferably 80-125 and even preferably 90-120 (in particular, 100-110). If the minimum Mooney scorch viscosity is lower than 70, the stability of the core wires may lower. If the minimum Mooney scorch viscosity is higher than 130, the workability may decrease and the durability may lower because cracks are prone to develop in the belt.

In this application, minimum Mooney scorch viscosity can be measured according to the Mooney scorch test of JIS K 6300-1 (2013), more specifically, can be measured according to a method described in Examples to be described later.

The hardness (JIS-A) of the vulcanizate of the above-described rubber composition is, for example, about 80-90, preferably 82-89 and even preferably 83-88 (in particular, 85-87). If the hardness of the vulcanizate is too low, the effect of suppressing the phenomena that the rubber component of the tension rubber layer flows out to the compression rubber layer side through gaps between the core wires and that the core wires bite into the tension rubber layer may lower. Conversely, if the harness is too high, the bendability may lower to increase the power loss and the durability may lower because cracks are prone to develop in the belt.

In this application, the degree of hardness (JIS-A) means a value Hs (JIS A) measured according to the durometer hardness test (A type) prescribed in JIS K 6253 (2012) ("Vulcanized rubber and thermoplastic rubber-method for determining hardness-").

In the present invention, it is preferable that the vulcanizate that forms the tension rubber layer be in direct contact with the above-described core wires. Thus, in the V-ribbed belt of the invention, it is preferable that no adhesion rubber layer or adhesion rubber component exist between the core wires and the tension rubber layer and it is preferable that the V-ribbed belt have neither an adhesion rubber layer nor an adhesion rubber component. That is, although in many V-ribbed belts an adhesion rubber layer or an adhesion rubber component is disposed between the core wires and the tension rubber layer in order to increase adhesion between the core wires and the tension rubber layer, where an adhesion rubber layer or an adhesion rubber component is used, the advantages of the present invention may lower because a phenomenon that adhesion rubber flows into gaps of the core wires or the core wires bite into the adhesion rubber layer is prone occur.

The thickness (average thickness) of the tension rubber layer is, for example, about 0.5-10 mm, preferably 0.7-8 mm and even preferably 1-5 mm.

[Core Wires]

The V-ribbed belt of the present invention has the core wires which are buried so as to be arranged in the belt width direction at a prescribed interval. The core wires stay stably in the belt thickness direction. The deviations of the core wires in the belt thickness direction (i.e., the variation of its depth positions from the belt back surface) may be smaller than or equal to 0.08 mm. The deviations of the core wires in the belt thickness direction may be, for example, smaller than or equal to 0.05 mm, preferably smaller than or equal to 0.04 mm and even preferably smaller than or equal to 0.03 mm (e.g., about 0.01-0.03 mm). If the deviations of the core wires in the belt thickness direction are large and only part of the core wires are located on the belt back surface side or the belt inner surface side, stress tends to concentrate on the core wires to accelerate their bending fatigue. The bending fatigue of the core wires is averaged between the core wires and the durability is increased by decreasing deviations of the core wires in the belt thickness direction.

In this application, deviations of the core wires in the belt thickness direction can be measured by a method that will be described in Examples later.

Examples of fiber that constitutes the core wires (or core bodies) are kinds of fiber that are high in the elastic modulus such as high-strength polyethylene fiber, PBO fiber, polyester fiber (e.g., polyalkylene arylate-based fiber such as PET fiber and PEN fiber, and polyarylate fiber), polyamide fiber (e.g., aramid fiber), and inorganic fiber such as carbon fiber. These kinds of fiber can be used either singly or as a combination of two or more kinds thereof.

A tensile elastic modulus of the fiber that constitutes the core wires is preferably selected from an approximate range of 1-500 GPa. To effectively exhibit the advantages of the present invention, it is preferable that the tensile elastic modulus of the fiber be 50 GPa or larger. The tensile elastic modulus of the fiber may be, for example, about 50-500 GPa, preferably 55-300 GPa and even preferably 60-200 GPa (in particular, 65-150 GPa). Examples of such high-elastic modulus fiber include aramid fiber and carbon fiber.

In the present invention, even core wires made of high-elastic modulus fiber having a tensile elastic modulus of 50 GPa or larger can be increased in stability.

In this application, a tensile elastic modulus can be measured by a method of measuring a load-elongation curve by the method described in JIS L1013 (2010) and determining an average gradient in a region where the load is lower than or equal to 1,000 MPa.

The average fineness of the fiber (monofilament yarns) may be, for example, about 0.1-5 dtex, preferably 0.3-3 dtex and even preferably 0.5-2 dtex (in particular, 1-1.8 dtex). The fiber can be used in the form of a multifilament yarn as a raw thread (e.g., a multifilament yarn including monofilament yarns that are, for example, about 100-20,000 in number, preferably 500-5,000 (in particular, 600-2,000) in number).

To increase the tensile strength and the bending fatigue resistance, usually each of the core wires can be used in the form of, for example, a twisted cord using multifilament yarns (formed by, for example, organzine, single twist, or Lang lay). For example, in many cases, a twisted cord (twisted thread) obtained by second-twisting multifilament yarns described above as first-twisted yarns in a prescribed direction (e.g., in the same direction as the first-twisted yarns were twisted or in the direction opposite to it) is used as each core wire. The average diameter (average yarn diameter) of first-twisted yarns may be, for example, about 0.2-1 mm, preferably 0.3-0.8 mm and even preferably 0.4-0.7 mm. The average diameter (average wire diameter) of each cord (or core wire) may be, for example, about 0.3-1.5 mm, preferably 0.5-1.3 mm and even preferably 0.7-1.2 mm.

To improve the adhesion to the rubber component (in particular, ethylene-α-olefin elastomer), as in the case of the short fibers in the tension rubber layer, the core wires may be subjected to adhesion treatment using an epoxy compound, an isocyanate compound, an RFL treatment liquid, a silane coupling agent, or the like.

The core wires are usually buried in the longitudinal direction of the belt main body. Furthermore, the core wires may be buried in the longitudinal direction of the belt main body parallel with each other at a prescribed pitch. The core wire pitch, which is set according to the core wire diameter, is larger than the core wire diameter. The core wire pitch may be, for example, about 0.5-2 mm, preferably 0.7-1.7 mm and even preferably 0.8-1.5 mm.

[Compression Rubber Layer]

The compression rubber layer can be made of a rubber composition that is commonly used as a compression rubber layer of V-ribbed belts; for example, it can be made of the same rubber composition (e.g., a rubber composition containing ethylene-α-olefin elastomer) as employed in the above-described tension rubber layer.

The compression rubber layer can contain short fibers if necessary and need not always contain short fibers.

The compression rubber layer may contain a combination of hard carbon and soft carbon as a reinforcement agent. The mass ratio between the soft carbon and the hard carbon can be suitably selected according to required quality. For example, to attain a proper balance between reduction of a torque loss and application to high-load transmission, the soft carbon/hard carbon ratio can be selected from an approximate range of 10/90 to 99/1 (e.g., 30/70 to 90/10). For example, the soft carbon/hard carbon ratio may be about 40/60 to 80/20, preferably 45/55 to 70/30 and even preferably 50/50 to 60/40.

The thickness (average thickness) of the compression rubber layer may be, for example, about 1-30 mm, preferably 1.5-25 mm and even preferably 2-20 mm.

[Adhesion Rubber Layer]

The adhesion rubber layer can be made of a rubber composition that is commonly used as an adhesion rubber layer of V-ribbed belts; for example, it can be made of the same rubber composition (e.g., a rubber composition containing ethylene-α-olefin elastomer) as employed in the tension rubber layer.

The adhesion rubber layer can contain short fibers if necessary and need not always contain short fibers. To increase the adhesion, the adhesion rubber layer may contain resorcin-formaldehyde condensate, aminoresin, or the like.

The thickness (average thickness) of the adhesion rubber layer may be, for example, about 0.01-2 mm, preferably 0.1-1 mm and even preferably 0.2-0.5 mm. If the adhesion rubber layer is too thick, the stability of the core wires may decrease. If the adhesion rubber layer is too thin, it may become difficult to prepare and handle unvulcanized rubber sheets.

The adhesion rubber layer may be disposed between the core wires and the tension rubber layer and/or between the core wires and the compression rubber layer. However, a form without an adhesion rubber layer is preferable because it can increase the stability of the core wires.

[Fabric]

In the present invention, the surface (inner circumferential surface) of the compression rubber layer may be covered with a fabric. The durability and the sounding resistance of the V-ribbed belt can be increased by covering the surface of the compression rubber layer with a fabric. A fiber member such as a woven fabric (woven cloth), a knitted fabric (knitted cloth), an unwoven fabric can be used as the fabric and a knitted cloth is used in many cases. A knitted cloth that is commonly used as a knitted cloth or a cover cloth for covering the surface of the compression rubber layer of a V-ribbed belt can be used as the knitted cloth. The knitted cloth can be formed by water-absorbable fibers and/or non-water-absorbable fibers. The knitted cloth may be one made of water-absorbable fibers and non-water-absorbable fibers (e.g., a knitted cloth disclosed in JP-A-2016-70494) because it makes it possible to establish both of sounding resistance with water and wear resistance.

Examples of water-absorbable fiber (or fiber containing water-absorbable yarns) include vinyl alcohol-based fiber (e.g., polyvinyl alcohol, ethylene-vinyl alcohol copolymer fiber, and vinylon), polyamide fiber (e.g., aliphatic polyamide fiber such as polyamide 6 fiber, polyamide 66 fiber, and polyamide 46 fiber), cellulose-based fiber (e.g., cellulose fiber (e.g., cellulose fiber originating from a plant, an animal, or bacteria) and cellulose derivative fiber), and fiber originating from an animal (e.g., wool and silk). These kinds water-absorbable fiber can be used either singly or as a combination of plural kinds thereof. Among these kinds water-absorbable fiber, cellulose fiber (in particular, cotton fiber) is preferable.

Cellulose fiber may be spun yarns. The thickness (count) of cellulose fiber is, for example, about 5-100 count, preferably 10-80 count and even preferably 20-70 count (in particular, 30-50 count). If cellulose fiber is too thin, the mechanical characteristics of the knitted cloth may lower. If cellulose fiber is too thick, the water absorbency (the sounding resistance with water) of the knitted cloth may lower.

Examples of the non-water-absorbable fiber include synthetic fibers such as polyolefin fiber (e.g., polyethylene fiber and polypropylene fiber), non-water-absorbable polyamide fiber (e.g., aromatic polyamide fiber such as aramid fiber), acrylic fiber, polyester fiber (e.g., $C_{2-4}$alkylene$C_{6-14}$arylate-based fiber such as PET fiber, PPT fiber, PTT fiber, PBT fiber, and PEN fiber, and polyarylate-based fiber), PBO fiber, and polyurethane fiber, and inorganic fibers such as carbon fiber. These kinds of non-water-absorbable fiber can be used either singly or as a combination of two or more kinds thereof. Among these non-water-absorbable fiber, composite fiber of synthetic fibers (i.e., composite yarns of synthetic fibers) is preferable. Bulked yarns that are bulky in cross section (e.g., polyester-based composite yarns such as PTT/PET conjugate yarns) are particularly preferable because it can increase the wear resistance of the knitted cloth and suppress seeping-out of rubber to a frictional power transmission surface (or the surface of the knitted cloth).

The fineness of the non-water-absorbable fiber may be, for example, about 20-600 dtex, preferably 50-300 dtex and even preferably 60-200 dtex (in particular 70-100 dtex).

It is preferable that the fabric (in particular, knitted cloth) contain at least water-absorbable fibers (in particular, cellulose-based fibers). The proportion of non-water-absorbable fibers may be smaller than or equal to 200 parts by mass (e.g., 0-200 parts by mass) with respect to 100 parts by mass of water-absorbable fibers. The proportion of the non-water-absorbable fiber may be, for example, about 1-100 parts by mass, preferably 3-80 parts by mass (e.g., 5-50 parts by mass) and even preferably 10-40 parts by mass (in particular, 20-30 parts by mass). If the proportion of non-water-absorbable fibers is too large, the water absorbency of the knitted cloth may become so low as to lower the sounding resistance at the time of being awash with water.

There are no particular limitations on the structure of the knitted cloth and may employ a common structure. Single-layer weft knitting (e.g., weft knitting with a plain stitch (jersey stitch) knit structure) and multilayer knitting (e.g., moss stich (weft knitting with a moss stich knit structure)) are preferable, and multilayer knitting is particularly preferable. In the case of a multilayer knitted cloth, the number of layers of the knitted cloth may be, for example, two to five, preferably two to three and even preferably two.

For example, the density of fibers or yarns of the knitted cloth may be higher than or equal to 30/inch (e.g., 32-70/inch, preferably 34-60/inch and even preferably 35-55/inch) in each of the wale direction and the course direction. Furthermore, for example, the density of fibers or yarns of the knitted cloth in terms of the sum of a number in the wale direction and a number in the course direction may be higher than or equal to 60/inch (e.g., 62-120/inch, preferably 70-115/inch, even preferably 80-110/inch, and particularly preferably 90-105/inch).

To increase the adhesiveness to the surface of the compression rubber layer, if necessary, the fabric (in particular, knitted cloth) may be subjected to adhesion treatment. The adhesion treatment can also increase the wear resistance of the frictional power transmission surface (power transmission surface). This adhesion treatment may be the same as that for the short fibers in the tension rubber layer. Other types of adhesion treatment such as friction treatment in which a rubber composition is printed into the fabric by causing the fabric and the rubber composition to pass between calender rolls, spreading treatment in which mucilage is applied to the fabric, and coating treatment in which a rubber composition is laid on the fabric can also be employed.

The fabric (in particular, knitted cloth) may contain common additives on the surfaces of fibers or inside fibers. Common additives are, for example, a surfactant, a dispersant, a filler, a colorant, a stabilizer, a surface treatment agent, and a leveling agent. The proportion of the other components may be smaller than or equal to 10 mass % of the entire fabric. The proportion of the other components is, for example, about 0.01-5 mass %, preferably 0.1-3 mass % and even preferably 0.5-2 mass %.

The basis weight of the fabric (in particular, knitted cloth) is, for example, about 50-500 g/m², preferably 80-400 g/m² and even preferably 100-350 g/m².

The thickness (average thickness) of the fabric (in particular, knitted cloth) is preferably selected from an approximate range of 0.1-5 mm. The thickness of the fabric is about larger than or equal to 0.3 mm (e.g., 0.4-3 mm), preferably 0.5-2 mm and even preferably 0.7-1.5 mm.

[Manufacturing Method of V-Ribbed Belt]

A common manufacturing method of a V-ribbed belt can be used as a manufacturing method of a V-ribbed belt of the present invention. A molding die method (molded manufacturing method) including a step of pressing a laminate including an unvulcanized rubber sheet (unvulcanized tension rubber layer) for formation of a tension rubber layer and core wires against a die can be preferably used because it effectively exhibits the advantage of the present invention that the core wires can be stabilized. More specifically, this manufacturing method can manufacture a V-ribbed belt in which a compression rubber layer is covered with a fabric by, for example, laminating a fabric, an unvulcanized compression rubber layer, core wires, and an unvulcanized tension rubber layer, forming a resulting unvulcanized laminate into a cylinder shape using molding dies, forming a sleeve by vulcanization, and cutting a resulting vulcanized sleeve into a prescribed width. More specifically, a V-ribbed belt is manufactured by, for example, the following methods.

(First Manufacturing Method)

A V-ribbed belt can be manufactured using a molding machine which includes a hollow-cylinder-shaped outer die, a cylinder-shaped inner die which can be disposed inside the outer die in a concentric manner, and a pressing unit which can move or press a tubular unvulcanized laminate set between the outer die and the inner die toward the outer die. That is, a V-ribbed belt can be manufactured by laying a tubular unvulcanized laminate on the cylinder-shaped inner die disposed in the hollow-cylinder-shaped outer die in a concentric manner such that a fabric is opposed to the outer die; vulcanizing the tubular unvulcanized laminate while pressing it toward the outer die; and releasing the tubular vulcanized laminate from the dies and forming it into a prescribed shape. For example, the tubular unvulcanized laminate may be a hollow-tube-shaped or sleeve-shaped laminate including at least an unvulcanized compression rubber layer and an unvulcanized tension rubber layer laminated or disposed on one surface of the unvulcanized compression rubber layer, and including an unvulcanized rubber laminate sheet (unvulcanized compression rubber layer and unvulcanized tension rubber layer) to constitute a belt main body; core wires buried in the unvulcanized rubber laminate sheet; and a fabric which is laminated or disposed on the other surface of the unvulcanized compression rubber layer. Steps of disposing this laminate in such a manner that the fabric is opposed to rib portions of the outer die and vulcanizing the unvulcanized rubber laminate sheet while applying pressure may be employed.

More specifically, using a cylinder-shaped inner die on whose outer circumferential surface a flexible jacket is attached, a laminate is produced by winding the unvulcanized tension rubber layer on the flexible jacket, spinning the core wires (twisted cords) spirally on this sheet to constitute core bodies, and further winding the unvulcanized compression rubber layer and the fabric. Then the inner die on which the laminate is wound is set, in a concentric manner, inside the outer die that can be attached to the inner die and whose inner circumferential surface is carved with the plural rib portions. Subsequently, the laminate (compression rubber layer) is press-fit into the rib portions by expanding the flexible jacket toward the inner circumferential surface (rib portions) of the outer die and subjected to vulcanization. Then the inner die is detached from the outer die and a vulcanized rubber sleeve having plural ribs is released from the outer die, whereby a sleeve-shaped V-ribbed belt is produced. If necessary, as for a sleeve-shaped V-ribbed belt, the vulcanized rubber sleeve may be cut in the belt longitudinal direction by using a cutter into a prescribed width to produce V-ribbed belt. This first manufacturing method can produce a sleeve (or V-ribbed belt) having plural ribs by expanding a laminate having a tension rubber layer, core wires, a compression rubber layer, and a fabric at one time.

(Second Manufacturing Method)

In connection with the first manufacturing method, a method disclosed in, for example, JP-A-2004-82702 may be employed in which a preliminary mold body (in a semi-vulcanized state) is produced by expanding only a fabric and a compression rubber layer and then a tension rubber layer and core wires are compression-bonded to the preliminary mold body by expanding it and they are vulcanized and integrated together to produce a V-ribbed belt.

In the above methods (in particular, first manufacturing method), there are no particular limitations on the pressure to the unvulcanized rubber sheet (or cylinder-shaped unvulcanized laminate) against the outer die. However, in the case where core wires made of fiber having a large tensile elastic modulus are used, the pressure (e.g., expansive pressure of the flexible jacket) may be higher than or equal to 1.2 MPa (e.g., about 1.3-2 MPa, preferably 1.3-1.7 MPa). The application of such a pressure makes it possible to form rib shapes with high accuracy even in the case where the core wires are made of fiber having a large tensile elastic modulus. Furthermore, in the case where the tension rubber layer is made of a specific rubber composition, the core wires can be made more stable even if high pressure is applied making use of expansive power of the flexible jacket.

EXAMPLES

The present invention will be hereinafter described in more detail using Examples, but the invention is not restricted by those Examples. Methods for preparing a rubber composition, core wires, and a fabric, methods for manufacturing a belt, methods for measuring or evaluating each physical property, etc. will be described below.

[Rubber Compositions]

An unvulcanized calendered rubber sheet (a sheet for a tension rubber layer) having a prescribed thickness was produced by rubber-kneading each rubber composition shown in Table 1 using a Banbury mixer and causing resulting kneaded rubber to be processed by a calender roll. Furthermore, a sheet for a compression rubber layer and a sheet for an adhesion rubber layer were produced using rubber compositions shown in Table 2 in the same manner as the sheet for a tension rubber layer. The components shown in Table 1 and Table 2 are as follows. Table 2 also shows a composition of a rubber composition for knitted cloth adhesion treatment.

EPDM1: "EPT3070" produced by Mitsui Chemicals, Inc., Mooney viscosity (125° C.)≅47
EPDM2: "EPT3092M" produced by Mitsui Chemicals, Inc., Mooney viscosity (125° C.)≅61
EPDM3: "EPT4045M" produced by Mitsui Chemicals, Inc., Mooney viscosity (125° C.)≅33
EPDM4: "KELTAN (registered trademark) 5260Q" produced by Lanxess AG, diene content: 2.3 mass %, Mooney viscosity (120° C.): 55
EPDM5: "KELTAN (registered trademark) 2470" produced by Lanxess AG, diene content: 4.2 mass %, Mooney viscosity (125° C.): 24
Zinc oxide: "Zinc oxide grade 2" produced by Seido Chemical Industry Co., Ltd.
Stearic acid: "Steric acid Tsubaki" produced by NOF Corporation
Carbon black HAF: "SEAST (registered trademark) 3" produced by Tokai Carbon Co., Ltd., average primary particle diameter: 28 nm, iodine absorption amount: 80 mg/g
Carbon black SRF: "SEAST (registered trademark) S" produced by Tokai Carbon Co., Ltd., average primary particle diameter: 66 nm
Hydrated silica: "Nipsil VN3" produced by Tosoh Silica Corporation, BET specific surface area: 240 m²/g
Short fibers 1: "Nylon short fiber" produced by Nishiyori Co., Ltd., average fineness 6.7 dtex, average fiber length: 3 mm
Short fibers 2: "Nylon short fiber" produced by Nishiyori Co., Ltd., average fineness 6.7 dtex, average fiber length: 6 mm
Short fibers 3: "Cotton short fiber" produced by Hashimoto Co., Ltd., average fineness (cotton count): 8 count, average fiber length: 6 mm
Softener 1: "Diana process oil NS-90" produced by Idemitsu Kosan Co., Ltd.
Softener 2: "Diana (registered trademark) PW-380" (paraffin-based process oil) produced by Idemitsu Kosan Co., Ltd.
Anti-aging agent 1: "Nonflex OD-3" produced by Seiko Chemical Co., Ltd., octyldiphenylamine
Anti-aging agent 2: "NOCRAC (registered trademark) MB-O" produced by Ouchi Shinko Chemical Industrial Co., Ltd.
Organic peroxide 1: "PERCUMYL (registered trademark) D" produced by NOF Corporation, dicumyl peroxide
Organic peroxide 2: "PERCUMYL (registered trademark) D-40" produced by NOF Corporation, dicumyl peroxide, effective component: 40%
Vulcanization accelerator DM: di-2-benzothiazolyl disulfide
Sulfur: produced by Miwon Chemicals Co., Ltd.
Resorcin-formaldehyde condensate: "SUMIKANOL 620" produced by Taoka Chemical Co., Ltd.
Hexamethoxymethylolmeramine: "PP-1890S" produced by Power Plast Limited

TABLE 1

| Composition for tension rubber layer | | | | | | | | | | | |
|---|---|---|---|---|---|---|---|---|---|---|---|
| Material (parts by mass) | R-1 | R-2 | R-3 | R-4 | R-5 | R-6 | R-7 | R-8 | R-9 | R-10 |
| EPDM1 | 100 | 100 | — | 100 | 100 | — | — | — | — | — |
| EPDM2 | — | — | 100 | — | — | — | 100 | 100 | 100 | 100 |
| EPDM3 | — | — | — | — | — | 100 | — | — | — | — |

TABLE 1-continued

| Composition for tension rubber layer | | | | | | | | | | | |
|---|---|---|---|---|---|---|---|---|---|---|---|
| Material (parts by mass) | R-1 | R-2 | R-3 | R-4 | R-5 | R-6 | R-7 | R-8 | R-9 | R-10 |
| Zinc oxide | 5 | 5 | 5 | 5 | 5 | 5 | 5 | 5 | 5 | 5 |
| Stearic acid | 1 | 1 | 1 | 1 | 1 | 1 | 1 | 1 | 1 | 1 |
| Carbon black HAF | 50 | 50 | 50 | 50 | 50 | 50 | 50 | 50 | 50 | 50 |
| Short fibers 1 | 25 | 30 | 30 | — | 10 | 25 | — | — | 50 | 70 |
| Short fibers 2 | — | — | — | 30 | — | — | 30 | — | — | — |
| Short fibers 3 | — | — | — | — | — | — | — | 30 | — | — |
| Softener 1 | 5 | 5 | 5 | 5 | 5 | 10 | 5 | 5 | 5 | 5 |
| Anti-aging agent 1 | 2 | 2 | 2 | 2 | 2 | 2 | 2 | 2 | 2 | 2 |
| Organic peroxide 1 | 2 | 2 | 2 | 2 | 2 | 2 | 2 | 2 | 2 | 2 |
| Total | 190 | 195 | 195 | 195 | 175 | 195 | 195 | 195 | 215 | 235 |

TABLE 2

| Material (parts by mass) | Composition for compression rubber layer | Rubber composition for adhesion treatment | Composition for adhesion rubber layer |
|---|---|---|---|
| EPDM4 | 100 | — | — |
| EPDM5 | — | 100 | — |
| EPDM1 | — | — | 100 |
| Zinc oxide | 5 | 5 | 5 |
| Stearic acid | 1 | 1 | 1 |
| Carbon black SRF | 50 | — | — |
| Carbon black HAF | 40 | 80 | 35 |
| Hydrated silica | — | — | 20 |
| Softener 2 | 5 | — | — |
| Anti-aging agent 1 | — | — | 2 |
| Anti-aging agent 2 | 2 | 2 | — |
| Vulcanization accelerator DM | — | — | 2 |
| Sulfur | — | — | 1 |
| Organic peroxide 2 | 3 | 5 | — |
| Resorcin-formaldehyde condensate | — | — | 2 |
| Hexamethoxymethylolmelamine | — | — | 2 |
| Total | 206 | 193 | 170 |

[Core Wires]

An aramid cord having total fineness 4,400 dtex (number of filaments: 4,000) obtained by second-twisting (organzine) four first-twisted yarns that are multifilament yarns (number of filaments: 1,000) of aramid fiber of 1,100 dtex was used. After core wires were immersed in a resorcin-formalin-latex liquid (RFL liquid) in advance, to increase adhesion to rubber, overcoating treatment was performed using a processing liquid obtained by solving a rubber composition containing EPDM in an organic solvent (toluene).

[Knitted Cloth]

A knitted cloth was produced whose knit structure was weft knitting (moss stitch, two layers) by knitting cotton spun yarns (count: 40, single) as water-absorbable yarns and PTT/PET conjugate composite yarns (fineness: 84 dtex) as non-water-absorbable yarns at a mass ratio of (water-absorbable yarns)/(non-water-absorbable yarns)=80/20. A resulting knitted cloth had a thickness of 0.85 mm and a density (wale plus course) of 100/inch. Mucilage was produced by solving the rubber composition for adhesion treatment shown in Table 2 in toluene so as to obtain a solid content concentration of 10 mass %, and adhesion treatment was performed in which the knitted cloth was immersed in the mucilage and then dried at 100° C. for 3 minutes.

An average thickness and a density of a knitted cloth were measured in the following manners. An average thickness of a knitted cloth was measured according to JIS L 1096 (2010) in such a manner that the knitted cloth is placed on a flat stage after removing unnatural wrinkles and tension, a thickness was measured at five positions by a constant load type thickness measuring instrument, and an arithmetic average of resulting thickness values was calculated and employed as an average thickness. A density of a knitted cloth was measured according to JIS L 1096 (2010) in such a manner that the knitted fabric is placed on a flat stage after removing unnatural wrinkles and tension, the number of meshes in a 1-inch length was measured at five arbitrary positions, and an arithmetic average of them was calculated and employed as an average density.

Examples 1-8 and Comparative Examples 1-3

[Preparation of V-Ribbed Belt]

In Examples 1-7 and Comparative Examples 1-3, a cylinder-shaped inner die in which a flexible jacket was attached to the outer circumferential surface was used, an unvulcanized sheet for a tension rubber layer made of each rubber composition shown in Table 1 was wound on the flexible jacket attached to the outer circumferential surface in such a manner that short fibers were oriented in the belt width direction, core wires (twisted cords) to serve as core bodies were spun spirally on the sheet, and, furthermore, an unvulcanized sheet for compression rubber layer having the rubber composition shown in Table 2 and a knitted cloth were wound thereon to form a laminate. The inner die on which the above tubular laminate was wound was set, in a concentric manner, inside a cylinder-shaped outer die whose inner surface was carved with plural rib portions, and the laminate was press-fit into the rib portions by expanding the flexible jacket and vulcanized at 180° C. Subsequently, the inner die was taken out of the outer die, a vulcanized rubber sleeve having plural ribs was released from the outer die and cut into a prescribed width in the belt longitudinal direction by a cutter. A V-ribbed belt was thereby prepared (number of ribs: 3, circumferential length: 1,100 mm, belt type: K type, belt thickness: 4.3 mm, rib height: 2 mm, and rib pitch: 3.56 mm).

In Example 8, a V-ribbed belt was produced in the same manner as in Examples 1-7 and Comparative Examples 1-3 except that a laminate was prepared in such a manner that a sheet for an adhesion rubber layer was wound between the core wires and the sheet for a tension rubber layer and between the core wires and the sheet for a compression rubber layer. The lamination structure of a V-ribbed belt obtained was such that an adhesion rubber layer existed between the core wires and a tension rubber layer and the core wires were not in contact with the tension rubber layer.

[Minimum Mooney Scorch Viscosity (Vm) of Tension Rubber Layer]

Figure 2:
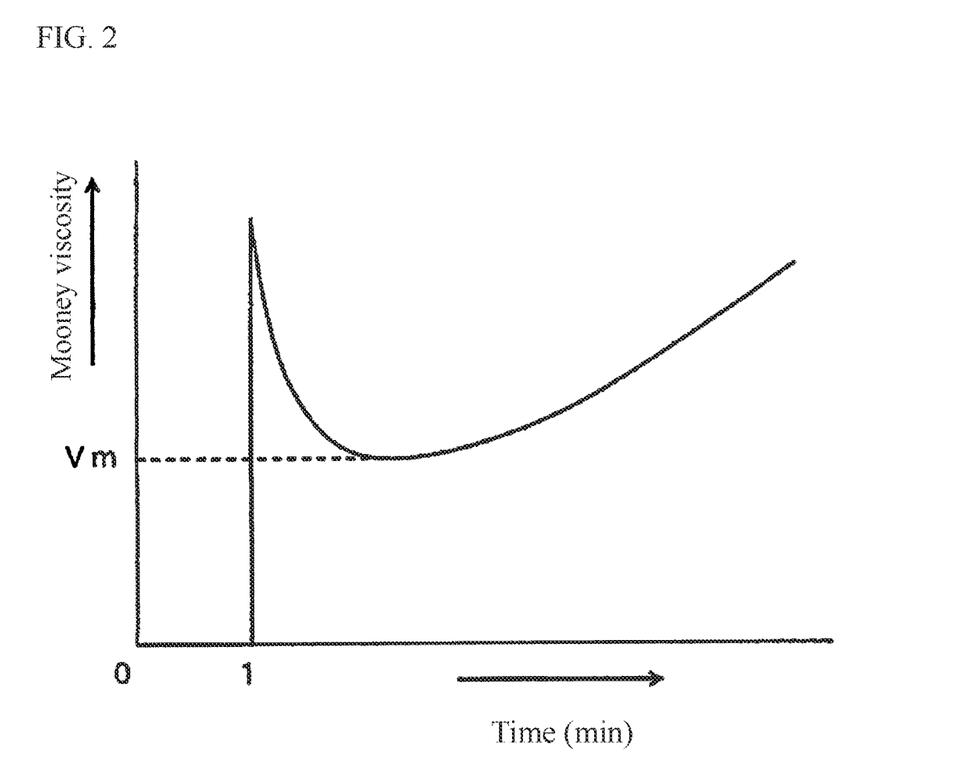
FIG. 2 is a graph showing a behavior of Mooney viscosity for description of a measuring method of minimum Mooney scorch viscosity (Vm).

Minimum Mooney scorch viscosity was measured according to the Mooney scorch test prescribed in JIS K 6300-1 (2013). An L-type rotor was used and a test temperature was set at 125° C. A polyester film ("Lumirror" produced by Toray Industries, Inc.) that is about 0.04 mm in thickness was placed between contact surfaces of a test piece (an unvulcanized composition for a tension rubber layer) and a die. Preliminary heating was performed for 1 minute after the die was closed, and then the rotor was rotated and a Mooney viscosity transition was recorded. Recorded Mooney viscosity generally exhibited a behavior as shown in FIG. 2. A minimum value of the Mooney viscosity was employed as minimum Mooney scorch viscosity (Vm). Measurement results are shown in Table 3.

[Rubber Hardness of Tension Rubber Layer]

A vulcanized rubber sheet (100 mm×100 mm×2 mm (thickness)) was produced by press-vulcanizing an unvulcanized sheet for a tension rubber layer at 180° C. for 20 minutes. Hardness of a laminate sample obtained by laying three vulcanized rubber sheets one on another was measured using a hardness test instrument (A-type durometer) according to JIS K 6253 (2012). Measurement results are shown in Table 3.

[Deviation of Core Wires in Belt Thickness Direction]

Figure 3:
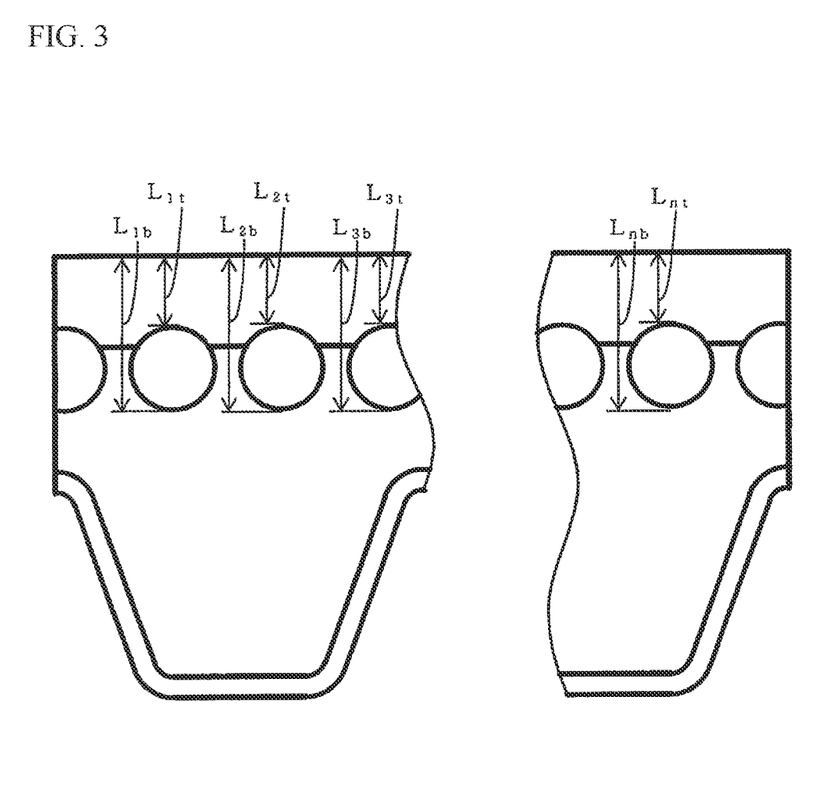
FIG. 3 is a rough diagram for description of a method for measuring a deviation of core wires in the belt thickness direction in Examples.

A deviation of the core wires in the belt thickness direction was measured to evaluate what extent the distance between the belt back surface and the core wires varied. A specific measurement procedure will be described below. First, a V-ribbed belt was cut parallel with the width direction and a resulting cross-sectional surface was observed by magnifying it 20 times by a microscope. As shown in FIG. 3, for each core wire a distance $L_{nt}$ from the belt back surface to the top of the core wire and a distance $L_{nb}$ between the belt back surface to the bottom of the core wire were measured. This was done in such a manner that measurement target core wires were limited to ones whose cross-sectional surfaces were observed entirely; a core wire whose cross-sectional surface could not be observed entirely (part of the core wire is seen in a belt end surface) was excluded from the measurement targets. Measurement was performed on all the measurement targets (n measurement targets, n being an integer that is larger than or equal to 2; in Examples, n is 9 or 10). A deviation X of the core wires in the belt thickness direction was calculated according to the following equations. Calculation results are shown in Table 3. It can be judged that the positions of the core wires in the belt thickness direction is more stable when X is smaller.

$$X_{2-1} = |(L_{2t} + L_{2b}) - (L_{1t} + L_{1b})|/2$$

$$X_{3-2} = |(L_{3t} + L_{3b}) - (L_{2t} + L_{2b})|/2$$

$$...$$

$$X_{n-(n-1)} = |(L_{nt} + L_{nb}) - (L_{(n-1)t} + L_{(n-1)b})|/2$$

$$X = (X_{2-1} + X_{3-2} + ... + X_{n-(n-1)})/(n-1)$$

[Durability Test]

Figure 4:
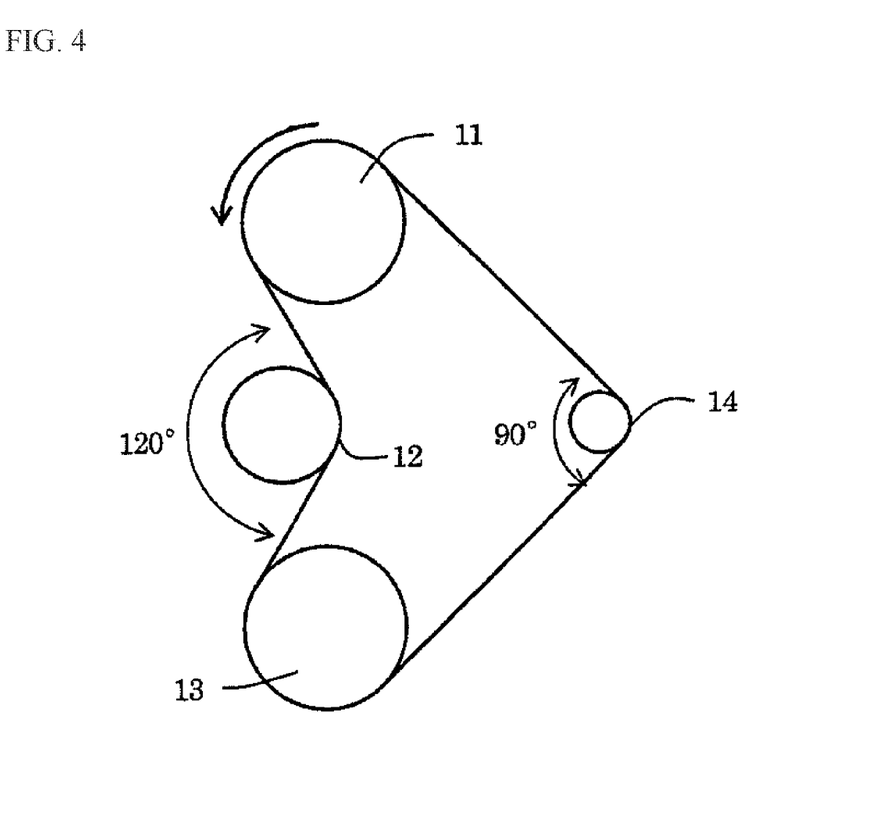
FIG. 4 is a rough diagram showing a layout of a test instrument that was used in a durability test in Examples.

A durability test was conducted using a test instrument in which a drive pulley 11 having an outer diameter 120 mm, an idler pulley 12 having an outer diameter 85 mm, a driven pulley 13 having an outer diameter 120 mm, and a tension pulley 14 having an outer diameter 45 mm were arranged in this order as shown in FIG. 4. A V-ribbed belt was engaged with each pulley of the test instrument and adjustments were made so that the winding angle of the belt to the idler pulley was 120°, the winding angle of the belt to the tension pulley was 90°, and the belt tension was 395 N. The rotation speed of the drive pulley was set at 4,900 rpm (the rotation direction is indicated by an arrow in the figure), the load on the driven pully was 8.8 kW, and the atmosphere temperature was set at 120° C., and the belt was run setting the upper limit of time at 500 hours. A life (hours) of each belt is shown in Table 3.

[24-Hour Strength Retention]

A belt was run under the same conditions as in the above durability test except that the running time was set at 24 hours. Tensile strength values of the V-ribbed belt before and after the run were measured and 24-hour strength retention was determined according to the following equation. Tensile strength was measured by a universal test instrument ("UH-200kNX" produced by Simadzu Corporation) under a condition that the pulling speed was 50 mm/min. Measurement results are shown in Table 3.

(24-hour strength retention (%)){=(tensile strength of V-ribbed belt after run)/(tensile strength of V-ribbed belt before run)}×100

In Table 3, the amount of short fibers (parts by mass) is a ratio with respect to 100 parts by mass of rubber component (EPDM) in the composition for a tension rubber layer.

Although the embodiment of the present invention has been described above, the invention is not limited to the above embodiment and various design changes are possible within the scope of the claims. The present application is based on Japanese Patent Application No. 2019-078096 filed on Apr. 16, 2019 and Japanese Patent Application No. 2020-053084 filed on Mar. 24, 2020, the disclosure of which are incorporated herein by reference.

INDUSTRIAL APPLICABILITY

The V-ribbed belt of the present invention is particularly useful when used as a V-ribbed belt for driving an auxiliary

TABLE 3

|  | Example | | | | | | | | Comparative Example | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Tension rubber composition | R-1 | R-2 | R-3 | R-4 | R-7 | R-8 | R-9 | R-3 | R-5 | R-6 | R-10 |
| Amount of short fibers (parts by mass) | 25 | 30 | 30 | 30 | 30 | 30 | 50 | 30 | 10 | 25 | 70 |
| Vm | 85 | 90 | 103 | 93 | 107 | 97 | 127 | 103 | 75 | 66 | 140 |
| Hardness (JIS-A) | 82 | 84 | 85 | 86 | 86 | 82 | 90 | 85 | 78 | 84 | 93 |
| Presence/absence of adhesion rubber layer | None | None | None | None | None | None | None | Present | None | None | None |
| Deviation (mm) of core wires in belt thickness direction | 0.035 | 0.032 | 0.028 | 0.027 | 0.023 | 0.034 | 0.023 | 0.068 | 0.13 | 0.095 | 0.022 |
| Durability test life (hours) | >500 | >500 | >500 | >500 | >500 | >500 | >500 | 420 | 5 | 90 | 200 |
| 24-hour strength retention | 81% | 82% | 85% | 84% | 87% | 84% | 80% | 74% | — | 45% | 61% |

As is apparent from the results shown in Table 3, the deviation of the core wires in the belt thickness direction was small, the durability test life was long, and the 24-hour strength retention was high in Examples 1-8 in which short fibers were mixed in large amount and tension rubber having a large Vm value was used. Among these Examples, Examples 3-5 were superior in balance and Example 5 was most superior. In Example 6 in which cotton short fibers were used in place of nylon short fibers, the deviation of the core wires in the belt thickness direction was larger and the 24-hour strength retention was a little lower than in Example 5: but Example 6 was in a level of no problems in practical use. Example 7 in which the proportion of short fibers was larger than in Example 3, cracks were prone to develop in the belt and the 24-hour strength retention was a little small though the deviation of the core wires in the belt thickness direction was small. Furthermore, in Example 8 which had an adhesion rubber layer, the deviation of the core wires in the belt thickness direction was large and the durability test life was short.

On the other hand, the deviation of the core wires in the belt thickness direction was large and the durability test life was short in Comparative Example 1 in which the content of short fibers was small and Comparative Example 2 in which the Vm value was small. In Comparative Example 3 in which the content of short fibers was large, cracks were prone to develop in the belt and the 24-hour strength retention was very small though the deviation of the core wires in the belt thickness direction was small.

machine of an automobile because it is high in durability, can be used as a V-ribbed belt of an automobile, a motorcycle, an agricultural machine, etc., and can be used in fields where a large transmission capacity is required.

DESCRIPTION OF SYMBOLS

1 . . . V-ribbed belt
2 . . . Compression rubber layer
3 . . . Core body
4 . . . Tension rubber layer
5 . . . Fabric

The invention claimed is:

1. A V-ribbed belt comprising:
   a tension rubber layer made of a vulcanizate of a rubber composition comprising a rubber component and short fibers; and
   a core wire,
   wherein a proportion of the short fibers in the rubber composition is 15-50 parts by mass with respect to 100 parts by mass of the rubber component, and
   the rubber composition has a minimum Mooney scorch viscosity measured at 125° C. of 70-130.

2. The V-ribbed belt according to claim 1, wherein the vulcanizate has a hardness (JIS-A) of 80-90.

3. The V-ribbed belt according to claim 1, wherein an orientation direction of the short fibers is a belt width direction.

4. The V-ribbed belt according to claim 1, wherein the short fibers have an average fiber length of 1-10 mm.

5. The V-ribbed belt according to claim 1, wherein fibers constituting the core wire have a tensile elastic modulus of 50 GPa or more.

6. The V-ribbed belt according to claim 1, wherein the core wire is in contact with the vulcanizate.

7. The V-ribbed belt according to claim 1, wherein a deviation of the core wire in a belt thickness direction is 0.08 mm or less.

8. The V-ribbed belt according to claim 1, further comprising a compression rubber layer provided on an inner circumference side of the tension rubber layer, wherein the tension rubber layer forms an outer circumferential surface of the belt, and the core wire is arranged to be in contact with and interposed between the tension rubber layer and the compression rubber layer.

9. A manufacturing method of the V-ribbed belt according to claim 1, the method comprising a step of pressing a laminate comprising a sheet of the rubber composition and the core wire against a die.

10. A rubber composition which is an unvulcanized rubber composition for forming a tension rubber layer of a V-ribbed belt, the rubber composition comprising a rubber component and short fibers,
  wherein a proportion of the short fibers is 15-50 parts by mass with respect to 100 parts by mass of the rubber component, and
  the rubber composition has a minimum Mooney scorch viscosity measured at 125° C. of 70-130.

* * * * *